US008024367B2

(12) United States Patent
Heinzel et al.

(10) Patent No.: US 8,024,367 B2
(45) Date of Patent: Sep. 20, 2011

(54) ALERT ENGINE

(75) Inventors: Thomas Heinzel, San Francisco, CA (US); Philip Huang, Fremont, CA (US); Claus Gschiermeister, Karlsruhe (DE)

(73) Assignee: SAP AG, Walldorf (DE)

( * ) Notice: Subject to any disclaimer, the term of this patent is extended or adjusted under 35 U.S.C. 154(b) by 473 days.

(21) Appl. No.: 10/742,794

(22) Filed: Dec. 23, 2003

(65) Prior Publication Data

US 2004/0225637 A1    Nov. 11, 2004

Related U.S. Application Data

(60) Provisional application No. 60/458,397, filed on Mar. 31, 2003.

(51) Int. Cl.
*G06F 7/00* (2006.01)
*G06F 17/30* (2006.01)

(52) U.S. Cl. ......... 707/802; 709/204; 709/206; 709/223

(58) Field of Classification Search ................. None
See application file for complete search history.

(56) References Cited

U.S. PATENT DOCUMENTS

| | | | | |
|---|---|---|---|---|
| 6,237,114 | B1 * | 5/2001 | Wookey et al. | 714/47 |
| 6,412,026 | B1 * | 6/2002 | Graf | 710/18 |
| 6,523,038 | B1 * | 2/2003 | Iida et al. | 707/100 |
| 2003/0033179 | A1 * | 2/2003 | Katz et al. | 705/7 |
| 2003/0115122 | A1 * | 6/2003 | Slater et al. | 705/35 |
| 2004/0024810 | A1 * | 2/2004 | Choubey et al. | 709/203 |
| 2004/0068481 | A1 * | 4/2004 | Seshadri et al. | 707/1 |
| 2004/0139085 | A1 * | 7/2004 | Eryurek et al. | 707/100 |
| 2005/0219061 | A1 * | 10/2005 | Lai et al. | 340/825 |
| 2006/0167989 | A1 * | 7/2006 | Bashen et al. | 709/203 |

OTHER PUBLICATIONS

SAP NetWeaver™, pp. 1-8, © 2003.
SAP APO with SAP liveCache 7.4, pp. 1-4, © 2003.
U.S. Appl. No. 10/742,833, filed Dec. 23, 2003, entitled "Alert Notification Engine".
U.S. Appl. No. 10/742,832, filed Dec. 23, 2003, entitled "Time Series Data Management".
U.S. Appl. No. 10/742,793, filed Dec. 23, 2003, entitled "Order Document Data Management".

* cited by examiner

*Primary Examiner* — Alicia Lewis
(74) *Attorney, Agent, or Firm* — Finnegan, Henderson, Farabow, Garrett & Dunner, LLP

(57) ABSTRACT

Methods and systems for managing alerts in a database are provided, whereby the alerts originate from at least one business application due to exceptional situations, and whereby the alerts are represented as objects, each object corresponding to one of a number of configurable alert types. Each of the alert type may be configured, so that alerts of that alert type comprise at least one of: an ID for uniquely identifying the alert, information representative of the type of alert, message text being descriptive of the alert, a set of parameters representative of business or control objects associated with the alert, an alert scope being representative of the relevance for partners or users, feedback information being representative of time and identity of acknowledging the alert by a partner or user, status information for controlling follow-up actions, validity time information, and priority information.

16 Claims, 21 Drawing Sheets

| Field | R marks | Type | K y |
|---|---|---|---|
| Client | Client of the system | | Key |
| Language | Language indicator | | Key |
| Alert type ID | Alert type identifier | | Key |
| Application ID | Application that uses Alert type, e.g. collaboration engine. No entry indicates a cross application Alert type | | |
| Alert structure ID | Alert structure identifier | | Foreign Key to Alert structure |
| Alert type history flag | Save obsolete Alert information | | |
| Alert type message ID | ABAP message class | | |
| Alert type message number | ABAP message number | | |
| Alert type priority | Default priority for Alerts of this type The default priority can be overridden by the "post Alert" interface | | |
| Alert type message type | ABAP message type: error, warning, info are used | | |
| Activation | Alert type active / inactive | | |
| /SCMB/ABAS_ADMIN | Include structure user and time stamp | Include structure | |

Fig. 7

| Fi ld | R marks | Typ | Key |
|---|---|---|---|
| Client | Client of the system | | Key |
| Language | Language indicator | | Key |
| Alert structure ID | Alert structure identifier (see below) | | Key |
| Type name | Name of the Alert type | | |

Fig. 8

| Fi Id | Remarks | Typ | Key |
|---|---|---|---|
| Client | Client of the system | | Key |
| Language | Language indicator | | Key |
| Alert structure ID | Alert structure identifier (see below) | | Key |
| /SCMB/ABAS_ADMIN | Include structure user and time stamp | Include structure | |

Fig. 9

| Fi ld | R marks | Typ | K y |
|---|---|---|---|
| Client | Client of the system | | Key |
| Language | Language indicator | | Key |
| Alert structure ID | Alert structure identifier (see below) | | Key |
| Structure name | Name of the structure | | |

Fig.10

| Fi ld | R marks | Typ | Key |
|---|---|---|---|
| Client | Client of the system | | Key |
| Language | Language indicator | | Key |
| Alert structure ID | Alert structure identifier (see below) | | Key |
| Alert structure sequence | Sequence of element within Alert structure | | Key |
| Alert parameter | Alert parameter | | |
| Alert element selectable | Element usable for selection of Alerts | | |

Fig. 11

| Fi ld | R marks | Type | K y |
|---|---|---|---|
| Client | Client of the system | | Key |
| Language | Language indicator | | Key |
| Alert parameter | Parameters of the Alert | | Key |
| Alert element | BW InfoObject (or similar) | | |
| Value help | Specify value help for user interface of this parameter | | |
| Documentation help | Specify documentation help for user interface of this parameter | | |
| /SCMB/ABAS_ADMIN | Include structure user and time stamp | Include structure | |

Fig. 12

| Fi ld | R marks | Typ | K y |
|---|---|---|---|
| Client | Client of the system | | Key |
| Language | Language indicator | | Key |
| Alert parameter | Parameters of the Alert | | Key |
| Alert parameter name | Alert parameter name | | |
| Alert parameter description | Alert parameter description | | |

Fig.13

| Fi ld | R marks | Typ | K y |
|---|---|---|---|
| Client | Client of the system | | Key |
| Language | Language indicator | | Key |
| Application ID | Application that uses Alert type, e.g. collaboration engine. | | |
| /SCMB/ABAS_ADMIN | Include structure user and time stamp | Include structure | |

Fig. 14

| Fi ld | R marks | Typ | K y |
|---|---|---|---|
| Client | Client of the system | | Key |
| Language | Language indicator | | Key |
| Application ID | Application that uses Alert type, e.g. collaboration engine. | | |
| Application type name | Name of Application type | | |

Fig. 15

| Fi ld | R marks | Type | Key |
|---|---|---|---|
| Alert ID | Alert identifier | GUID | Key |
| Client | Client of the system | | Key |
| Language | Language indicator | | Key |
| Alert type ID | Alert type identifier | | |
| Alert number | External identifier (Alert number) | | |
| Alert scope | Alert public, private to owner or available specific to a set of owners | | |
| Alert priority | Alert priority level | Number | |
| Valid from | Begin of validity period | Time stamp | |
| Valid to | End of validity period | Time stamp | |
| Create time | Time of creation in Alert Engine | Time stamp | |
| Create user | User who created Alert (if applicable) | | |
| Application creation | Application ID that created Alert | | |
| Application area creation | Application area when created | | |
| Change time | Time of change in Alert Engine | Time stamp | |
| Change user | User who changed Alert (if applicable) | | |
| Application change | Application ID that changed Alert | | |
| Application area change | Application area when changed | | |
| Alert feedback indicator | Feedback information for Alert (to simplify select) | Flag | |

Fig. 17

| Field | R marks | Type | Key |
|---|---|---|---|
| Alert ID | Alert identifier | GUID | Key |
| Client | Client of the system | | Key |
| Language | Language indicator | | Key |
| Field1 ... Field N | Alert parameter from first InfoObjects | | |

Fig. 18

| Fi ld | R marks | Typ | K y |
|---|---|---|---|
| Alert ID | Alert identifier | GUID | Key |
| Client | Client of the system | | Key |
| Language | Language indicator | | Key |
| Partner ID | Partner | | Key |
| User ID | Specific user or specific user group | | Key |
| Notification channel | Channel sent notification | | |
| Notification time | Time stamp of notification sent | | |
| Feedback indicator | Acknowledgement, user/partner delete, ... | | |

Fig. 19

| Fi ld | R marks | Typ | K y |
|---|---|---|---|
| Exception history number | Exception history index Numbering of versions: 1, 2, 3, ... | Number | Key |
| History time | Time exception history entry | Time stamp | |
| History partner | Partner whose action lead to history entry | | |
| History user | User whose action lead to history entry | | |
| History Application | Application ID that created exception history entry | | |
| History Application area | Application area when creating exception history entry | | |

Fig. 20

| Fi ld | Remarks | Typ |
|---|---|---|
| Application | Application that retrieves data | |
| Application area | Application area for which data is to be retrieved | |
| User | User | |
| Partner | Partner management | |
| Data select | IDs only or IDs + data (with structured return parameter or list of field-value pairs for the Alert parameters) | |
| Alert valid from | | Time stamp |
| Alert valid to | | Time stamp |
| Changed from | | Time stamp |
| Changed to | | Time stamp |

Fig. 21

| Field | Remarks | Type |
|---|---|---|
| Alert type | Alert type | |

Fig. 22

| Field | Remarks | Type |
|---|---|---|
| Alert structure element | Alert structure element identifier (InfoObject) | |
| Index | | |
| Sign | | |
| Option | | |
| Low | | |
| High | | |

Fig. 23

ALERT ENGINE

DETAILED DESCRIPTION

This application claims priority under 35 U.S.C. §119 based on U.S. Provisional Application No. 60/458,397, filed Mar. 31, 2003, the complete disclosure of which is incorporated herein by reference.

FIELD OF THE INVENTION

This application relates to methods and systems of managing alerts that need to be created, stored and retrieved by supply chain planning and collaboration applications and to be communicated to participants in the supply chain processes.

BACKGROUND INFORMATION

Computer systems, in particular distributed computer networks that execute application programs may detect exceptional situations. These exceptional situations may be unexpected, and may have impact on other parties participating in the network. Therefore, the applications of the computer systems or of the distributed computer network generate alerts to inform one or more users about the exceptional situation. Such kinds of alerts may be the termination of a contract, a delivery problem for an order, a potential out-of-stock situation, or technical problems in a system.

Alerts are objects that consist of general attributes regarding partners, users and time of creation or change, a message text with configurable place holders and data structure for application data that can be configured. The alert type of the alert describes this configuration. The scope of the alerts themselves can be restricted, either to specific partners, or more specifically according to the application data.

SUMMARY OF THE INVENTION

It is an object of the present invention to provide methods and systems of managing alerts in a database, which methods and systems allow a unified handling of alert messages throughout various applications.

In one aspect, a method of managing alerts in a database is provided, whereby the alerts originate from at least one business application due to exceptional situations, whereby the alerts are represented as objects, each object corresponding to one of a number of configurable alert types.

Advantageous implementations can include one or more of the following features. Each of the alert type may be configured, so that alerts of that alert type may include at least one of: (1) an ID for uniquely identifying the alert; (2) information representative of the type of alert; (3) message text being descriptive of the alert; (4) a set of parameters representative of business or control objects associated with the alert; (5) an alert scope being representative of the relevance for partners or users; (6) feedback information being representative of time and identity of acknowledging the alert by a partner or user; (7) status information for controlling follow-up actions; (8) validity time information; and (9) priority information.

A scheme of database tables and corresponding code segments may be generated to access the database tables.

An active alert list may be maintained in which alerts are inserted which have a valid time information, and an alert history list is maintained in which alerts which are no longer valid are moved from said active alert list.

The lists may comprise the alerts together with information relating to the type of alert.

The exceptional situation may be defined as a relation of at least one variable of said business application to at least one predetermined value.

The database may be held in a centralized engine.

Alerts in said lists may be selected according to predefined parameters.

An alert may be stored together with time stamp information relating to the time of origin of the exceptional situation in the at least one business application of the time stamp information.

The alert may be stored together with status information relating to an undertaken or to be executed action with respect to the exceptional situation.

The alert engine offers the possibility to associate notes with each alert. This allows commenting and communicating an alert. Notes can be private or shared among partners and users.

The method of the invention may further comprise storing a history list of acknowledgements made by users and partners, relating to an alert and storing the history of comments of users or partners relating to an alert.

The scope of alert may be restricted to an application area, the application area being a parameter which is useful for the business applications to distinguish different sets of alert which are manipulated by different alert update processes.

The invention also comprises a computer system for performing the methods according to the invention.

The invention further comprises a computer-readable storage medium comprising program code for performing the methods according to the invention, when loaded into a computer system.

Advantageously, the alert engine offers the possibility to store a history of alerts for retrospective analysis (audit trail functionality). The alert type determines whether alerts are to be tracked in a history list. Alerts that are no longer valid are automatically moved from the list of active alerts to a list of past alerts. Applications or users can also actively delete alerts, which are then transformed to the alert history, too.

BRIEF DESCRIPTION OF THE DRAWINGS

FIG. 7 illustrates an exemplary alert table;
FIG. 8 illustrates an exemplary alert type text name;
FIG. 9 illustrates an exemplary alert structure for structured alert information;
FIG. 10 illustrates an exemplary alert structure text name;
FIG. 11 illustrates an exemplary alert structure element;
FIG. 12 illustrates an exemplary data object for alert parameters;
FIG. 13 illustrates an exemplary alert structure parameter name;
FIG. 14 illustrates an exemplary object of an alert type related application;
FIG. 15 illustrates exemplary text name attached to application ID for alert engines;
FIG. 17 illustrates an exemplary table for storing alerts
FIG. 18 illustrates an exemplary structure of alert parameters;

FIG. 19 illustrates an exemplary data structure for alert feedback;

FIG. 20 illustrates an exemplary data structure of an alert history table;

FIG. 21 illustrates exemplary parameters to specify application, application area, and type of data to be read by the alert engine;

FIG. 22 illustrates an exemplary table to specify alert types of retrieval; and

FIG. 23 illustrates an exemplary table to specify alert parameter solutions.

DESCRIPTION OF THE EMBODIMENTS

Figure 1:
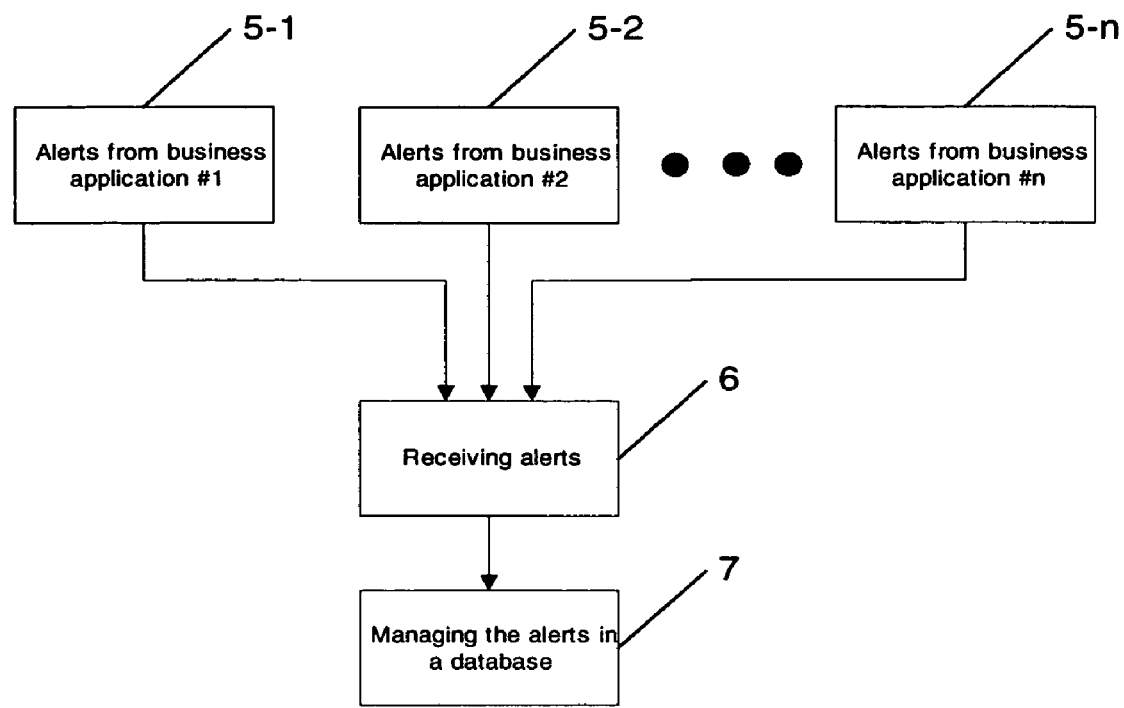
FIG. 1 illustrates a first embodiment of the invention.

A first embodiment of the invention is described with reference to FIG. 1. The alert engine 2 is a configurable module to manage the database storage of alert data. Through the configuration of alert types, the alert engine 2 can support various processes and applications of supply chain management mySAP SCM (Supply Chain Management software product provided by SAP Aktiengesellschaft, Walldorf, Germany).

Detection of exceptions and creation of corresponding alerts may be performed by applications 5-1, 5-2, ... 5-n that are connected to the alert engine and use its services for a unified handling of alert messages. The alert engine may allow the selection of alerts by arbitrary alert parameters.

Alerts due to exceptional situations, originating from applications 5-1, 5-2, ... 5-n may be received in step 6, whereby the alerts are represented as objects, each object corresponding to one of a number of configurable alert types.

Figure 2:
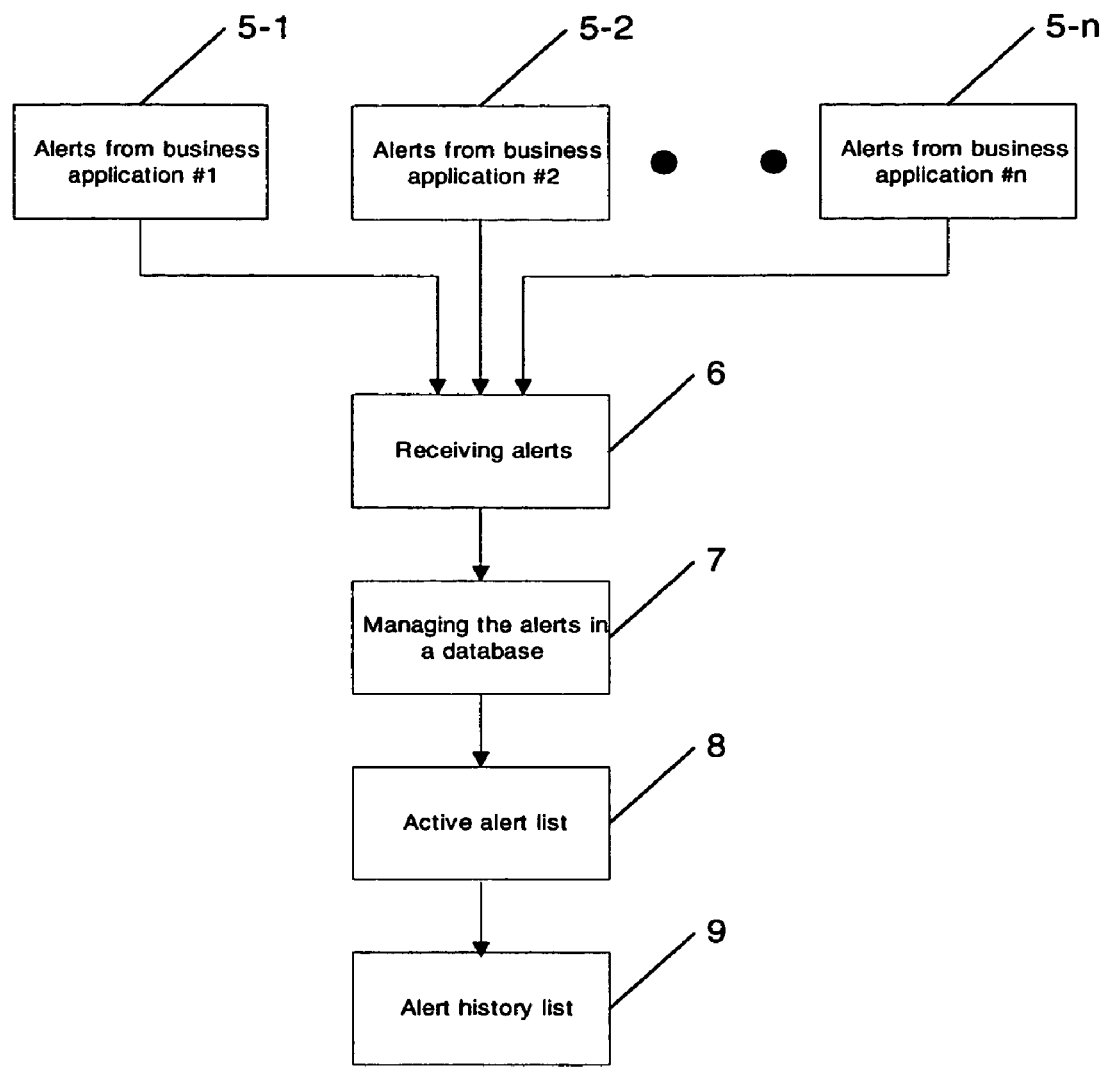
FIG. 2 illustrates a further embodiment of the invention.

In the embodiment of FIG. 2, the alerts may be managed in a database at step 7. Further, an active alert list may be maintained, step 8, in which alerts are inserted which have a valid time information, and an alert history list is maintained in which alerts which are no longer valid are moved from the active alert list, see step 9.

Alerts according one embodiment of the invention may be instances of a class of entities, which are described by an alert type. Alert types can be associated with a particular application. Each alert type represents a different structure to store alert information details.

The alert structure may specify a set and a sequence of parameters relevant for one or several alert types. Some or all of the alert parameters of an alert structure can be chosen to be relevant for selection. Alert types may define the alert's parameters, message text and the association of placeholders in the message text with specific parameters. The parameters themselves also may have configurable date types and descriptions. For each alert type, a corresponding generated data engine holds the alerts of that type.

Alert types may be configurable. Through configuration of alert types, the alert engine can support all processes and applications of the supply chain collaboration platform. The possibility to configure new alert types is particularly useful in connection with the configurable data types employed by the transactional data management and with configurable functions in the supply chain management solution mySAP SCM. For example in a collaboration process involving collaboration objects of different partners collaboration functions could be used to compute macros that determine alert situations in the synchronization of the supply chain and set the appropriate alerts. The alert parameters may be provided from collaboration objects' data. Both alert type and data type are configurable as well as the alert condition computed and checked by the collaboration function.

Each alert may have exactly one alert type. Upon activation of an alert type, the alert engine may generate code that allows selecting alerts according to these parameters.

The alert engine may be designed for high data volume and high throughput scenarios. The introduction of different sets of tables for different alert types helps to limit the number of table entries that need to be searched for particular alert information.

Alerts may contain the following data: (1) alert ID to uniquely identify the object; (2) alert type; (3) message (textual description of alert situation); (4) alert parameters (set of fields that describe business and control objects associated with the alert; these objects may be used for display and follow-up actions on an alert); (5) alert scope (the alert scope data may describe the relevance of an alert for specific partners and users; its use is optional and determined by the alert type); (6) alert feedback information, e.g., who acknowledged an alert and when; (7) alert status information (status data may be set by the applications that use the alert engine or in user interface that shows alerts; they can be used to control follow-up actions that are required by an alert); (8) validity time interval; (9) priority; and (10) comments on alerts as links to a notes management with information giving the time, partner and user that entered the comment.

The set of parameters may be variable and is configured by the alert type of the individual alert. For each alert type, a corresponding set of generated database tables may hold the alerts of that type. Selection over various alert properties, in particular over all or some of the alert parameters is possible. Applications can use special parameters—the alert application areas—to identify sets of alert objects that are created and deleted by a particular algorithm. This simplifies the search for alerts that are obsolete.

Via user interfaces, the following configuration tasks for the Alert Engine can be performed: (1) maintain alert type; (2) maintain alert structure type; (3) maintain alert parameter; and (4) activate alert type.

In a further embodiment, the alert engine according to the invention can be used for alert management. External services can use the alert engine to store and retrieve alerts.

The external services have to take care of deleting obsolete alerts if the alert does not persist any longer. This task may become complex if different functions in one or different services monitor the same alert conditions. To deal with this task, all alerts may be subdivided into different groups according to the following criteria: (1) alert type; (2) application (internal or external engine or service; this field is usually used to distinguish the origins of the alerts such that a group of services that posts alerts does not interfere with alerts from other services); (3) application area; (this is a free field that applications may use to distinguish between alerts handled by different functions within a service so that different functions of a service can create and delete alerts without interference to alerts from other services); and (4) individual parameter values.

By using this system of alert properties, different scenarios of alert management can be implemented:

All applications (i.e. supply chain collaboration services or external systems) that handle alerts may have to retrieve or delete the alerts that have already been created by their application and application area in order to determine whether these alerts persist or have to be deleted:

Firstly, different engines may usually access separate alert data. This is facilitated by criteria of alert type and application.

Secondly, different functions (e.g., for macros executed within collaboration processes) may access separate alert data. The easiest way to set the correct alerts is to delete all alerts belonging to a function first, and then to create new alerts depending on the current situation. More complex alert handling, which leads to a more meaningful alert history, can be achieved keeping old alerts if the alert situation is unchanged or even changing alert parameters when the parameters cauterizing an alert are changed but the alert itself persists. This joined set of alerts can be built employing different alert types, and application areas.

Thirdly, different functions of one engine may manage (partially) shared alert data. In this case, the individual functions have to select the alert data by appropriate alert parameters in order to determine which alerts are to be deleted or to be changed. Each of the functions may have to insure not to delete alerts whose alert situation persists.

The following list displays a typical example of alert types in the Inventory Collabaration Hub (ICH) application of mySAP SCM:

no stock;
stock under minimum;
stock over minimum;
message validation;
new release received;
release acknowledged;
advanced shipment notification(ASN) delivery time is in the past; and
goods receipt different from ASN quantity.

The alert engine may provide functions for application services on the ICH platform to manage alerts. For this purpose, the alert engine offers generic interfaces to manipulate and retrieve alerts of any alert type:

create alerts;
change alerts;
withdraw alerts;
query (retrieve) alerts
query a history of alerts;
query a historic snapshot of alerts. and
query history of comments associated with alerts.

Interfaces of the alert engine may also be accessible for all other systems outside of the ICH platform. In particular, the alert engine could be used to collect alerts from different systems and to share them with partners. This could include e.g., alerts sent by a connected Advanced Planner and Optimizer (APO) alert monitor. APO alert monitor is a part of the APO supply chain planning solution within the mySAP SCM software product delivered by SAP.

Thus, any user group that participates in or monitors business processes on the supply chain collaboration platform may be able to make use of the alert engine. Within ICH there may be user interfaces to present alerts of the Alert Engine to users of various partners, where the partner relationship determines the scope of the alerts that are visible to a user:

One of these interfaces may be the alert list view, which offers a list display of the alert information in a grid. The details to be displayed, i.e., the visible parameters, can be configured for each alert type and collaboration book view.

Another interface may be the alert overview, which offers a two-dimensional aggregated view on the number of alert by characteristics. This view may display the number of alerts as a key figure in a grid spanned by the alert's parameters as characteristics. Drilldown and aggregation is possible by adding or hiding additional alert parameters. The alert overview may be used to find problem spots within the collaboration supply chain planning or supply chain execution processes.

The alert engine may provide a means to notify partners or more specifically user groups associated with partners. This functionality may use a general notification service. With the notification service, the alert messages to be communicated can be configured in the sense that partners and users can subscribe or can be associated to alerts of a certain type with certain parameters. The notification can be achieved using e-mail, fax, pager, cellular phone messages etc.

In a further embodiment, the alert engine user interface may use a notes management service and supply chain collaboration engine to manage textual information.

The Alert Engine offers the possibility to store a history of alert objects for retrospective analysis. The alert type may determine whether alerts are to be stored in the history. Alerts that are no longer valid may be automatically moved from the list of active alerts to a list of past alerts. Applications or users can also actively delete alerts, which are then transformed to the alert history, too. Similarly the alert history contains former versions of alerts that have been changed by an application. The alert history tables may directly resemble the corresponding alert tables with additional information on time, user and mode of change.

Regularly entries in an alert history may only be created, not changed or deleted. However, there may be a function to re-organize such data. Alert history may be kept for audit trail functionality and for reporting on the frequency and severity of exceptional situations in the connected applications.

Figure 3:
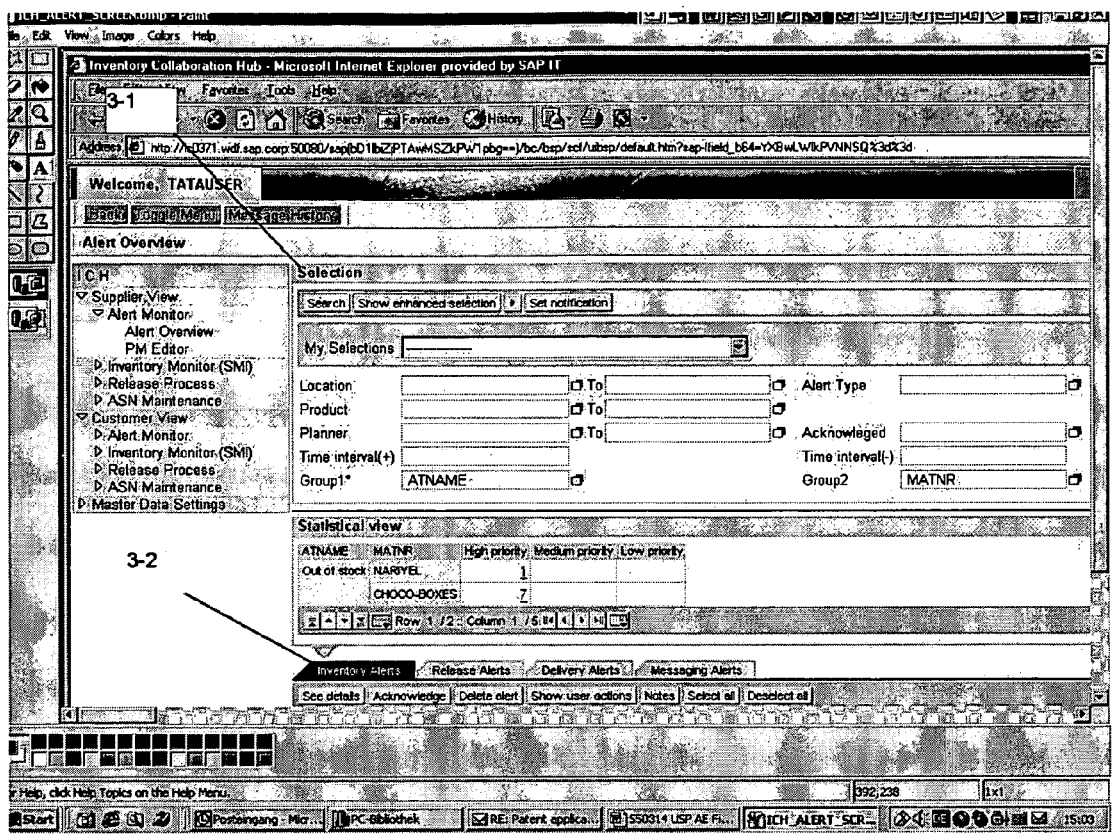
FIG. 3 illustrates exemplary screen prints.

FIG. 3 shows alerts as they are displayed in the example application. The field 3-1 comprises a selection menu for selecting alerts. The field 3-2 allows to select the display of different kinds of alerts, i.e., inventory alerts, release alerts, delivery alerts, and messaging alerts. In the displayed example, the inventory alerts have been selected for display. Therein, field "location" denotes the external application where the respective alert originates. The field "Alert Type" denotes the type of alert. The screen itself may not be part of the alert engine.

In the following, the functions of the Alert Engine are described in more detail, and the corresponding database structures are given. Descriptions and language dependencies in the database design are not taken into account.

Alert types may be based on messages and structured data (alert parameters). Messages are based on the concept of SAP R/3 Advanced Business Application Programming (ABAP) error, warning and information messages. In addition, a numerical priority can be given to any alert.

Messages provide a short and a long text that can be finalized at run-time using placeholder variables related to alert parameters. Messages are language dependent.

Alert parameters may be given by an alert structure that is a sequence of alert elements. Each alert element may specify a data type and description and whether it can be used for selection.

The alert engine 1 itself may not provide a notification mechanism. Instead, it may make use of an external notification service denoted alert notification engine, to allow the communication of alert messages to predefined destinations by fax, e-mail, SMS, pager, etc. One possibility for such a notification engine to be built on the supplied chain collaboration platform is to use the alert framework that is part of SAP technology platform SAP Netweaver (a software product delivered by SAP).

Figure 4:
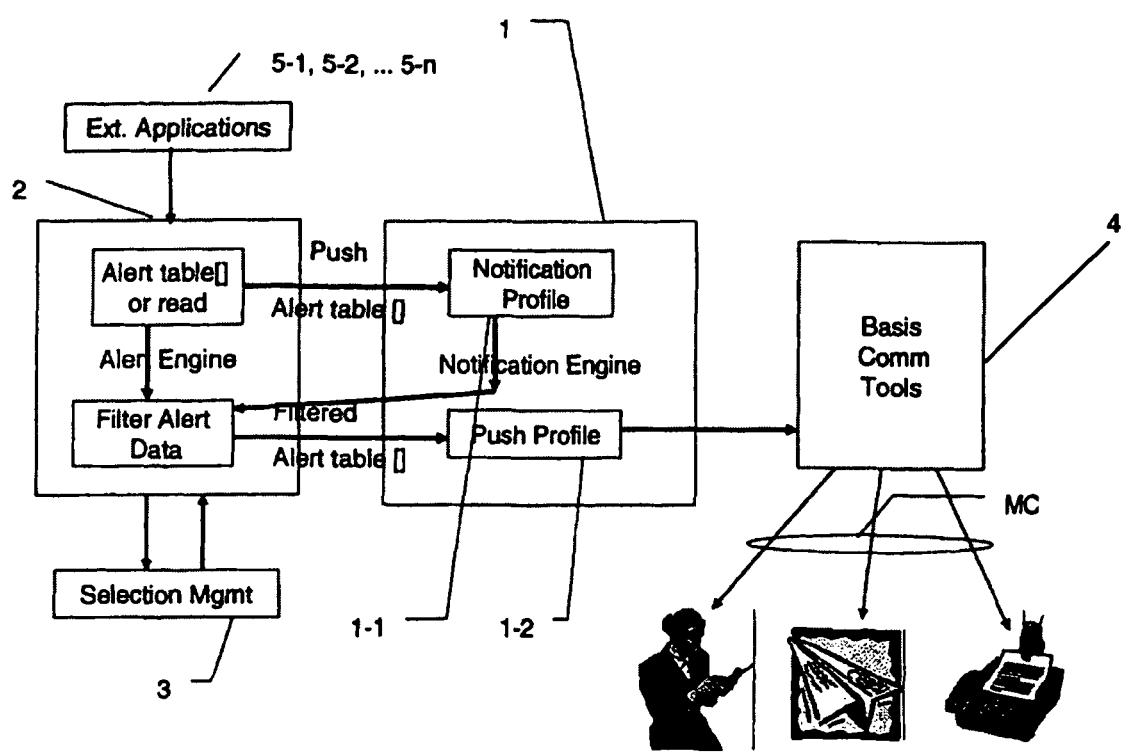
FIG. 4 illustrates an exemplary push scenario.

Hereby, a push scenario as shown in FIG. 4, starts from one or several external applications 5-1, 5-2, . . . 5-*n* with alerts. The alert engine 2 may store the alerts and may pass them to the alert notification engine 1. The alert notification engine 1 may determine the relevant notification profile 1-1, and then may make the call back to the alert engine 2 to filter the alert data according to the specified selection ID. Push profile 1-2 may comprise data useful for communicating the alerts via specified message channel to the respective users.

Then, the alert engine may filter the alerts based on criteria determined by the alert notification engine 2. After filtered alerts are returned to the notification engine and further being processed by basis communication tools 4, they may be sent to the destination via the channel defined in the respective notification profile 1-1.

Figure 5:
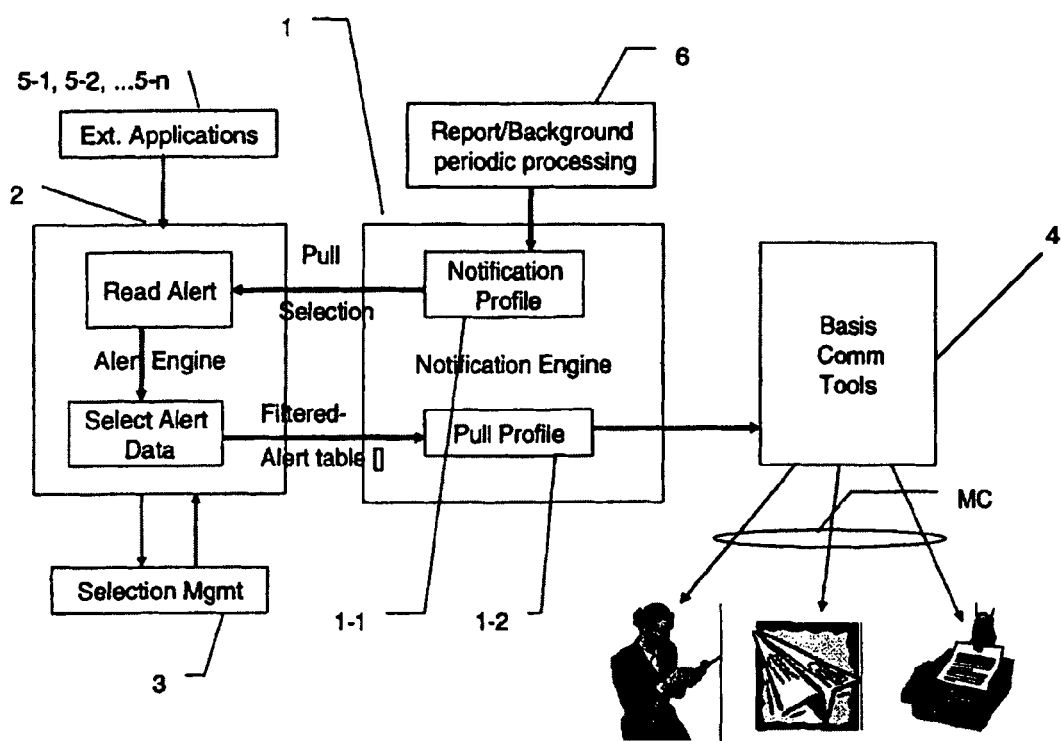
FIG. 5 illustrates an exemplary pull scenario.

In the pull scenario according to FIG. 5, alert notification may be triggered from a report process 6, which is a direct or periodic background processing 6. Based on selection criteria, the alert notification engine 1 may transmit calls to the alert engine 2. Then, alert engine 2 may read data from the alert engine data storage in order to prepare the selected alerts. Push profile 1-2 may comprise data useful for communicating the alerts via specified message channel to the respective users.

The alert engine may use an API from the selection management 3 for selecting alerts, which may then be returned to the notification engine 1. The alerts may be further processed by basis communication tools 4 and transmitted to the destination via the channel defined in the notification profile 1-1.

Figure 6:
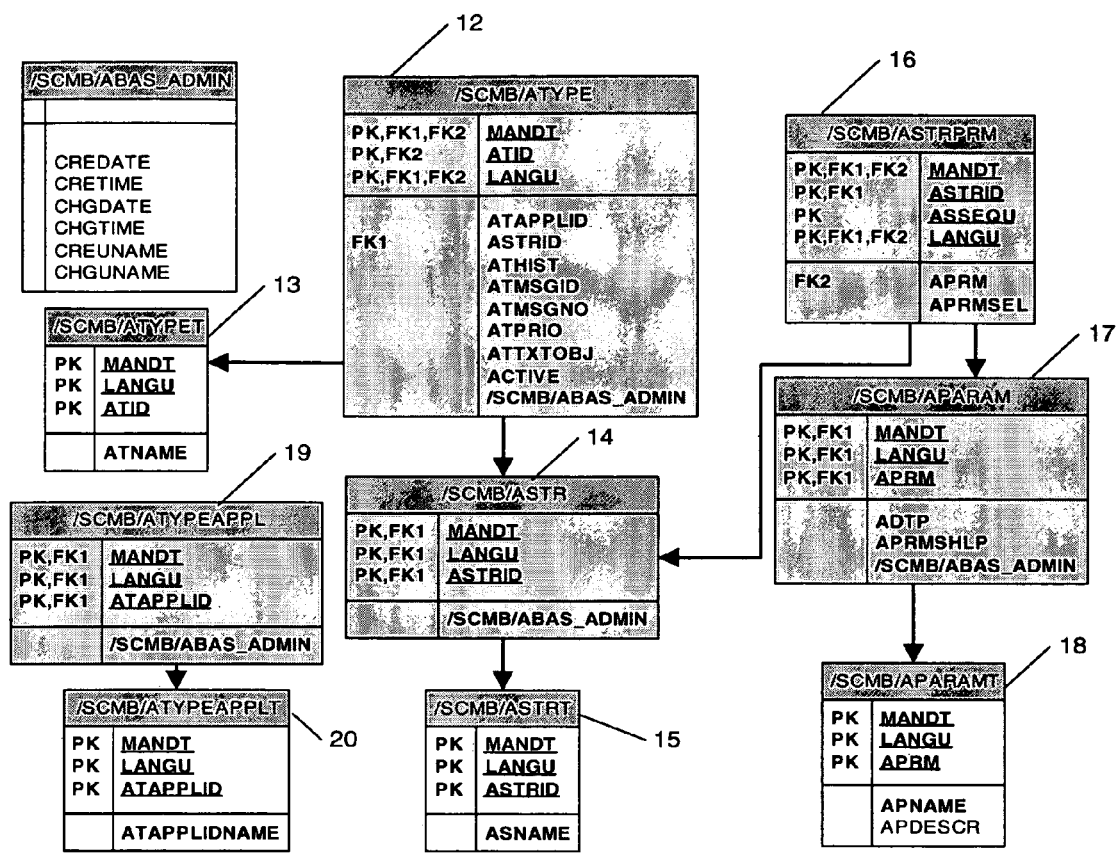
FIG. 6 illustrates an exemplary foreign key relationship between alert type, alert structure; and alert element.

In one embodiment, alert types may be based on the data model of FIG. 6, which also shows the foreign key relationship between alert type, alert structure and alert element. The details of exemplary data objects are explained below.

The exemplary objects in FIG. 6 are as follows:
/SCMB/ATYPE 12: alert type: message and alert structure;
/SCMB/ATYPET 13: alert type text name;
/SCMB/ASTR 14: alert structure for structured alert information;
/SCMB/ASTRT 15: alert structure text name;
/SCMB/ASTRPRM 16: alert structure element to describe one alert parameter of the alert structure;
/SCMB/APARAM 17: alert structure parameter value;
/SCMB/APARAMT 18: alert structure parameter text name;
/SCMB/ATYPEAPPL 19: alert type related application; and
/SCMB/ATYPEAPPLT 20: alert type related application text name.

Below, these exemplary objects are explained in more detail.

When an alert type is active, its corresponding alert table 12 may be created. FIG. 7 "alert table" displays such an exemplary alert table. Only for empty alert and alert history tables, an alert type may be deactivated. Only for inactive alert types, the corresponding alert structures may be changed.

The text name attach /SCMB/ATYPET 13 to alert type may have the structure as given in FIG. 8.

The alert structure /SCMB/ASTR 14 may consist of a header and the sequence of alert elements, as given in FIG. 9. Alert structures can be active or inactive. Only inactive alert structures may be changed. Only active alert structures may be used in active alert type.

An exemplary text name attach /SCMB/ASTRT 15 to alert structure /SCMB/ASTR 14 is given in FIG. 10.

An exemplary alert structure parameter /SCMB/ASTR-PRM 16 is given in FIG. 11. This alert structure element describes one alert parameter of the alert structure 14.

An alert parameter may describe a field to be used in the alert engine. It is specified by a name and its data type. Optionally one can attach a search-help for input on selection screens. FIG. 12 shows an exemplary data object for the alert parameters 17. It may specify name, description, data type and length of the alert parameter, and describes the fields of the alert tables. Within each alert structure, the InfoObjects may have to be unique.

An exemplary alert parameter text /SCMB/APARAMT 18 according to FIG. 13 may specify the text name attach to alert parameter.

FIG. 14 defines an exemplary object of an alert type related application. FIG. 15 defines an exemplary text name attached to application ID for alert engines.

The alert data management may allow creation, change, and deletion of alert records. It may also be used to select alerts of given type, time interval of validity and selection of alert parameters.

Figure 16:
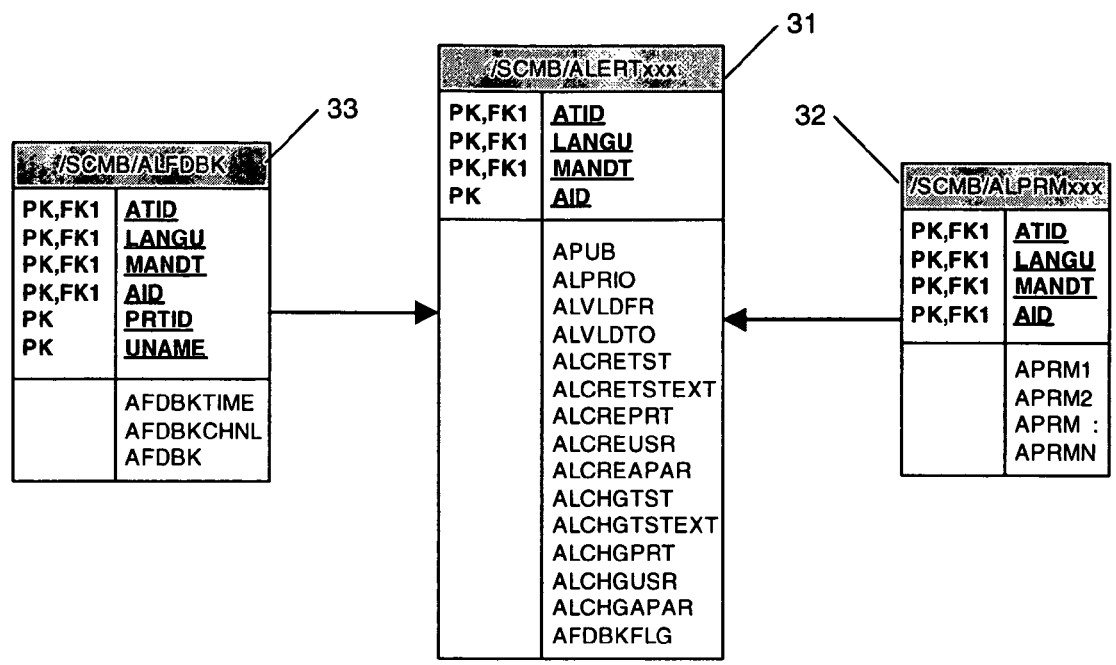
FIG. 16 illustrates an exemplary alert data model.

The diagram according to FIG. 16 represents an exemplary alert data model, which is explained in detail in the following paragraphs:
/SCMB/ALERTxxx 31: alert table for a specific alert type;
/SCMB/ALPRMxxx 32: assignment of alerts to partners; and
/SCMB/ALFDBK 33: feedback information to alerts.

Each alert may be identified by a globally unique alert ID (GUID) and an alert number, which may be unique for each instance of an alert engine and which can be used to identify the alert for user interaction.

The validity time interval of an alert may be a filter for alert selection. Alerts that are past their "valid to" times are deleted and can be kept in the alert history table if the alert type is configured this way.

The application ID and application area may determine the engine or external system and the function executed by that engine or system that created or changed an alert. This may be used to divide the set of all alerts into different subsets related to particular functions, so that a specific function that posts alerts may or may not influence the alerts created by other functions.

Alerts may be stored in tables of the form given in FIG. 17. FIG. 18 displays an exemplary structure of the alert parameters /SCMB/ALPRMxxx 32.

Notes and acknowledgement of alert situations can be stored depending on partner and user or user group. Notes can be public (which means that they are available for all partners specified by the alert and alert-partner tables) or private. The notes themselves and a history of their changes may be handled by a document management service on the mySAP SCM platform.

A partner or user can also change the status of an alert to "acknowledged" (those alerts are still visible although in a different way) or "deleted" (these alerts are not selected any more for this partner or user. This partner or user specific "deletion" may be distinct from the deletion of the alert itself in the sense that it only affects the partner or user specific view. Interactive deletion of the alert itself may also be allowed for certain users (authorization). FIG. 19 displays an exemplary data structure /SCMB/ALFDBK 33 for the alert feedback.

Alert history tables may be kept for audit trail functionality. FIG. 20 displays an exemplary data structure of an alert history table /SCMB/ALFDBK 33.

Alerts can be stored in the alert history by any of the following actions:
they are changed by an application;
they are deleted by an application;
they are deleted by user interaction (non user-specific deletion); and
they become obsolete (validity time interval) and are either selected or found by a reorganization function.

The alert history tables may directly resemble the corresponding alert tables with the following additional fields. Regularly, alert history entries may only be created, not changed or deleted. However, there may be functions to re-organize these tables.

The deletion of the alert from the tables that contain the current alerts and the move to the alert history may be done automatically whenever such alerts are handled by the alert engine, i.e. in connection with user interaction or the alert engine—engine interfaces. In addition, a specific report may be scheduled to perform this task.

Similar tables may keep track of the history of alert feedback, alert partners, and alert external identifiers: The additional key field may be the same as for the alert history itself.

Applications external to the Alert Engine's system may post alerts, so that the Alert Engine may collect alerts from different systems to provide a single point of access to partner for alert based messaging. This corresponding XML interface for alert posting would correspond closely to the "post alert" interface described above. XML message standards for posting alerts could also be supported and mapped to the Alert ENgine's XML interface.

The supply chain management services may use the "query alerts" interface to retrieve alert information from the alert engine. This interface may import a selection of alerts to be retrieved, parameters that specify the extent of the alert information to be extracted and exports a list of alerts with associated data such as notes, external IDs etc. Services may need this interface to determine alerts that need to be changed or deleted because the alert situation has been changed.

Exemplary parameters to specify application, application area and type of data to be read by the alert engine are given in FIG. 21. An exemplary table to specify alert types to be retrieved is given in FIG. 22. An exemplary table to specify alert parameter selections is given in FIG. 23.

For exporting to other applications, alert type and alert information may be given by the structure of the alert table for this alert type in one of the following forms:

represented by table of tables: for each alert type with the corresponding structures; and represented by a table of general alert information with the alert parameters in a separate table (as for the post alert interface).

These tables may be accompanied by the corresponding alert history information (if requested). Table to represent external alert identifiers (if requested). Table to represent alerts, feedback indicators and associated note IDs (if requested).

Applications external to the Alert Engine's system may retrieve alerts from the Alert Engine, so that the Alert Engine not only collects alerts from different systems but also provides a means of distributing them to other services (compare also notification mechanism below). The corresponding XML interface for alert retrieval could resemble closely the "Query alert" interface described above.

In one embodiment, the Alert Engine may be capable of sending alerts message to participants in supply chain collaboration processes. Alerts posted by applications may be evaluated to determine whether they are relevant for communication.

The determination of relevance for communication may be based on the following alert data:
 alert type;
 alert partners;
 alert new or changed;
 alert application and application area; and
 alert parameter conditions.

This information may be mapped to a message category and passed to the notification or communication mechanisms along with the alert message data.

A general notification service on the supply chain collaboration platform may allow notification of partners by various means such as email, SMS messages to mobile phones, pagers, fax etc. The partner, user group and users to be notified for a given message may depend on the message category, time and may further depend on the message's content.

The assignment of partners, dependent user groups and users to messages can be configured by the owner of the notification service but can also be based (in parts) on a subscription mechanism. Users of authorized partners may be able to specify their interest in certain messages, their preferred means of communication and also may be able to define substitute representatives within their user groups.

Selections of alerts may be done using the selector part of the Alert Monitor user interface collaboration book. The selection may be based on the following selection criteria:
 validity interval of alert (overlap logic);
 alert type(s);
 alert parameters: available for selection are all alert structure elements that are marked selectable for one of the alert types chosen; and
 "acknowledged alerts": flag to choose whether to display only new or also acknowledged alerts.

Selections can be pre-defined and assigned to partners and users. A user may be allowed to define its own selections. Users can mark and sort their selections as favorites/bookmarks.

The Alert Monitor may be a user interface screen within ICH to display alert information in lists. Columns can be chosen to display only the most relevant data. Navigating from the alert, all alert parameters can be shown on an additional details screen element. The alert list may allow users to view, create and change notes associated with alerts (see below). The alert list may also allow users to acknowledge alerts. After acknowledgement, alerts may be visible only upon specific request (user dependent or partner dependent). The alert list may also allow for user dependent and partner dependent deletion of alerts. This "soft" deletion makes the alert invisible to the respective partner or user. The alert list may also allow a user with the right authorization to fully delete an alert from the list of current alert. This "hard" deletion may make the alert invisible to all users and partners and transforms it to the alert history (if used for the alert type in question).

The alert overview may be a two-dimensional display that displays the number of alerts depending on alert parameters. It can be used to analyze alerts across multiple characteristics and to find the critical spots in a supply chain. With the alert overview display, the x- and y-axis can be chosen to represent one or more alert parameters such as alert type, validity time, product, location etc., in a manner very similar to the dimensional grid display of time-series data in the collaboration book. The "key figure" may be the number of alerts for the chosen alert types.

Past alert situations could be displayed in the same way as current alerts. The alert history's additional fields may serve as additional alert parameters for the alert list and overview user interfaces.

The selection of validity and create/change times may work for past exceptions in the same way as for current exceptions.

The authorization concept of the alert engine may be specific for partner and user. The application data taken into account may be alert types and certain alert parameters such as product, location and version. Actions performed on alerts may be the actions described above for the user interfaces. In addition, there may be authorizations to specify new alert types in connection with the authority to specify corresponding engine functions that create and delete such alerts.

As described above, alert structures and alert types can be freely defined. This may be implemented through customizing transactions.

The distributed computer networks as mentioned above may be used, for example, for producing goods, delivering parts for assembling products, controlling technical or economical processes, or implementing telecommunication activities.

The present techniques can be implemented in digital electronic circuitry, or in computer hardware, firmware, software, or in combinations of them. Apparatus of the invention can be implemented in a computer program product tangibly embodied in a machine-readable storage device for execution by a programmable processor. Method steps according to the invention can be performed by a programmable processor executing a program of instructions to perform functions of the invention by operating on the basis of input data, and by generating output data. The invention may be implemented in one or several computer programs that are executable in a programmable system, which includes at least one programmable processor coupled to receive data from, and transmit data to, a storage system, at least one input device, and at least one output device, respectively. Computer programs may be implemented in a high-level or object-oriented programming language, and/or in assembly or machine code. The language or code can be a compiled or interpreted language or code. Processors may include general and special purpose microprocessors. A processor receives instructions and data from memories, in particular from read-only memories and/or random access memories. A computer may include one or more mass storage devices for storing data; such devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by or incorporated in ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical or text user interface through which computer programs interact with users.

A computer may include a processor, memory coupled to the processor, a hard drive controller, a video controller and an input/output controller coupled to the processor by a processor bus 21. The hard drive controller may be coupled to a hard disk drive suitable for storing executable computer programs, including programs embodying the present technique. The I/O controller may be coupled by means of an I/O bus to an I/O interface. The I/O interface may receive and transmit in analog or digital form over at least one communication link. Such a communication link may be a serial link, a parallel link, local area network, or wireless link (e.g., an RF communication link). A display is coupled to an interface, which is coupled to an I/O bus. A keyboard and pointing device are also coupled to the I/O bus. Alternatively, separate buses may be used for the keyboard pointing device and I/O interface.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method of managing alerts, the method comprising:
   receiving, by a database, a first alert and a second alert from a business application;
      the first alert including information that identifies a first user, a first validity time period, and information that relates to an alert type, and
      the second alert including a second validity time period;
   storing the first and second alerts in the database;
   pulling periodically the first and second alerts from the database;
   pushing the first and second alerts to the first user and a second user;
   removing, based on a first request received from the first user, availability of the first alert from the first user, while retaining availability of the first alert to the second user;
   removing, based on a second request received from the second user, availability of the first alert from the second user and other users;
   storing the first alert in an alert history after removing availability of the first alert from the second user and other users, and before the first validity time period has passed,
      wherein storing the first alert in the alert history comprises storing the first alert together with information that identifies the second user as the sender of the second request, and
      wherein the alert history is configured to report information relating to frequency and severity of the first alert;
   removing, after the second validity time period has passed, availability of the second alert from the first user and the second user;
   storing the second alert in the alert history after removing availability of the second alert from the first user and the second user; and
   retrieving, from the alert history, the information that identifies the second user as the sender of the second request.

2. The method of claim 1, wherein the alert type is configured to comprise at least one of:
   an ID for uniquely identifying the first alert;
   information representative of the type of the first alert;
   message text being descriptive of the first alert;
   a set of parameters representative of business or control objects associated with the first alert;
   an alert scope being representative of the relevance for partners or users;
   feedback information being representative of time and identity of acknowledging the first alert by a partner or a user;
   status information for controlling follow-up actions;
   validity time information; or
   priority information.

3. The method of claim 1, comprising generating for the alert type a scheme of database tables and corresponding code segments to access the database tables.

4. The method of claim 1, comprising maintaining an active alert list to include the first alert prior to storing the first alert in the alert history.

5. The method of claim 4, wherein the active alert list comprises information relating to the type of the first alert prior to storing the first alert in the alert history.

6. The method of claim 4, wherein the first alert in the active alert list is selected according to predefined parameters.

7. The method of claim 1, wherein the first alert is received by the database due to an exceptional situation, the exceptional situation being defined as a relation of at least one variable of the business application to at least one predetermined value.

8. The method of the claim 1, wherein the database is held in a centralized engine.

9. The method of claim 1, wherein the first alert is received by the database due to an exceptional situation, and wherein the first alert in the database is stored together with time stamp information, the time stamp information relating to the time of origin of the exceptional situation in the one business application.

10. The method of claim 1, wherein the first alert is received by the database due to an exceptional situation, and wherein the first alert is stored together with status information, the status information relating to an undertaken action with respect to the exceptional situation.

11. The method of claim 1, further comprising:
storing a history list of commands made by users and partners relating to the first alert stored in the database.

12. The method of claim 1, further comprising:
storing a history list of acknowledgement and status values set by users and partners relating to the first alert stored in the database.

13. A system comprising:
a computer-readable storage medium; and
a processor coupled to the computer-readable storage medium, the computer-readable storage medium storing instructions which, when executed by the processor, cause the processor to perform the method according to claim 1.

14. A non-transitory computer-readable storage medium comprising program code which, when executed by a processor, performs the method according to claim 1.

15. A system comprising:
a computer-readable storage medium; and
a processor coupled to the computer-readable storage medium, the computer-readable storage medium storing instructions which, when executed by the processor, cause the processor to perform the method according to claim 2.

16. A non-transitory computer-readable storage medium comprising program code for performing the method according to claim 2, when loaded into a computer system.

* * * * *